(12) United States Patent
Gulati et al.

(10) Patent No.: US 7,346,078 B2
(45) Date of Patent: Mar. 18, 2008

(54) PROCESSING OF RECEIVED DATA WITHIN A MULTIPLE PROCESSOR DEVICE

(75) Inventors: Manu Gulati, Santa Clara, CA (US); Laurent Moll, Saratoga, CA (US); James Keller, Redwood City, CA (US)

(73) Assignee: Broadcom Corporation, Irvine, CA (US)

( * ) Notice: Subject to any disclaimer, the term of this patent is extended or adjusted under 35 U.S.C. 154(b) by 943 days.

(21) Appl. No.: 10/356,324

(22) Filed: Jan. 31, 2003

(65) Prior Publication Data

US 2004/0037292 A1 Feb. 26, 2004

Related U.S. Application Data

(60) Provisional application No. 60/419,031, filed on Oct. 16, 2002, provisional application No. 60/380,740, filed on May 15, 2002.

(51) Int. Cl.
*H04J 3/22* (2006.01)

(52) U.S. Cl. ........................ 370/469; 370/474

(58) Field of Classification Search ............... None
See application file for complete search history.

(56) References Cited

U.S. PATENT DOCUMENTS

| | | | |
|---|---|---|---|
| 6,018,763 A * | 1/2000 | Hughes et al. | 709/213 |
| 6,687,781 B2 * | 2/2004 | Wynne et al. | 710/317 |
| 6,751,224 B1 * | 6/2004 | Parruck et al. | 370/395.6 |
| 7,185,200 B1 * | 2/2007 | Levine et al. | 713/176 |
| 2001/0037435 A1 * | 11/2001 | Van Doren | 711/153 |
| 2002/0191793 A1 * | 12/2002 | Anand et al. | 380/255 |
| 2003/0118048 A1 * | 6/2003 | Dally et al. | 370/466 |
| 2004/0003126 A1 * | 1/2004 | Boucher et al. | 709/250 |

* cited by examiner

*Primary Examiner*—Brian Nguyen
(74) *Attorney, Agent, or Firm*—Garlick, Harrison & Markison:; Timothy W. Markison; Jessica W. Smith

(57) ABSTRACT

A multiple processor device stores a stream of data as a plurality of data segments, which includes multiplexed data fragments from at least one of a plurality of virtual channels. The data segments that comprise the stream of data correspond to the multiplexed data fragments from the virtual channels. The multiple processor device then decodes at least one data segment in accordance with one of a plurality of transmission protocols to produce a decoded data segment. The multiple processor device then stores the decoded data segment to align it in accordance with a data path segment size. The multiple processor device then interprets the stored decoded data segment with respect to a corresponding one of the plurality of virtual channels to determine a destination of the stored decoded data segment. The multiple processor device then stores the decoded data segment as part of reassembled data.

31 Claims, 9 Drawing Sheets processing system 10 processing system 20 processing system 30 data mapping for I/O modules 62, 64, 70, and/or 72

Rx MAC module 60 or 66

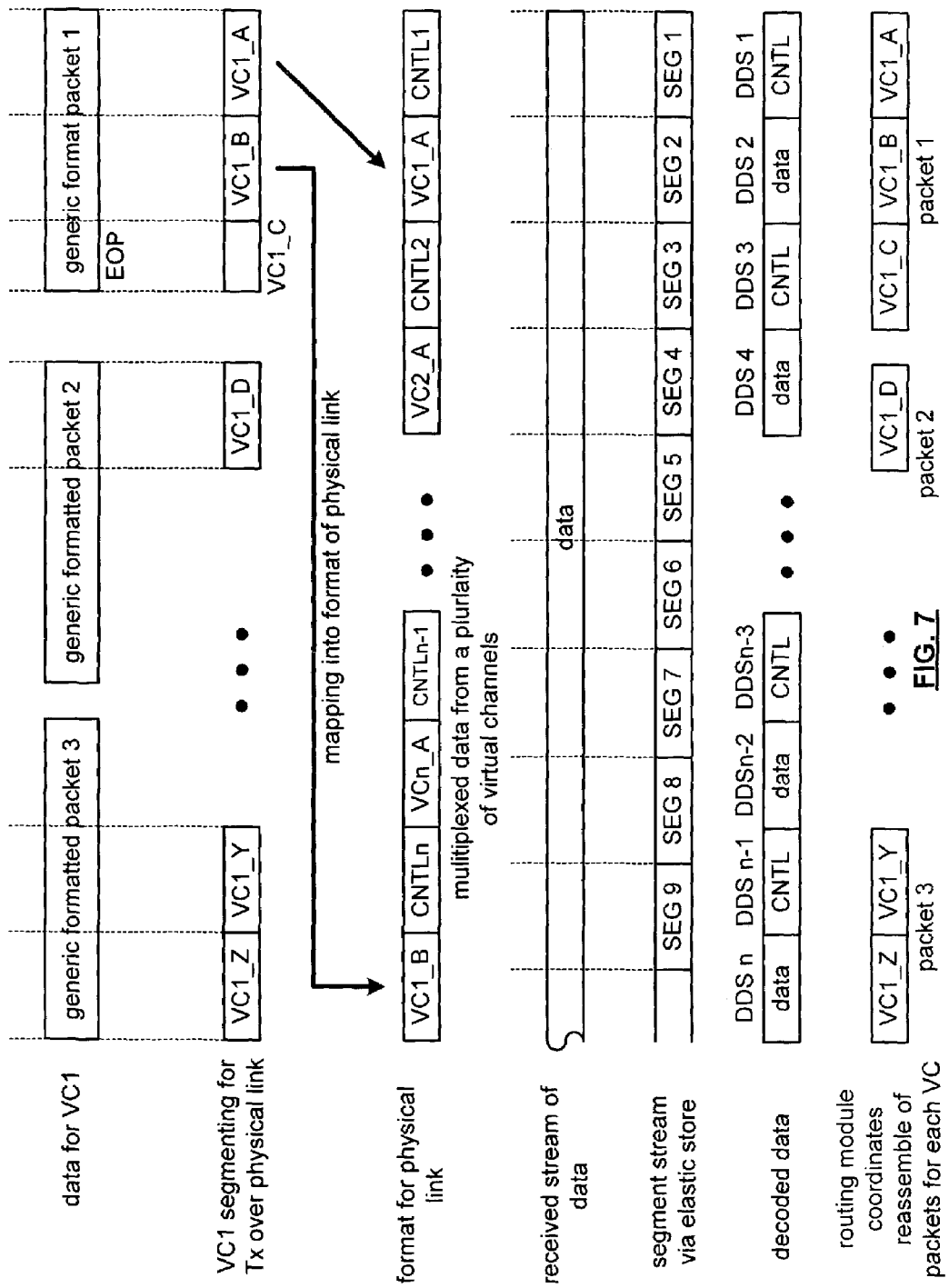

PROCESSING OF RECEIVED DATA WITHIN A MULTIPLE PROCESSOR DEVICE

The present application claims priority under 35 U.S.C. 119(e) to the following applications, each of which is incorporated herein for all purposes:

(1) provisional patent application entitled SYSTEM ON A CHIP FOR NETWORKING, having an application number of No. 60/380,740, and a filing date of May 15, 2002; and (2) provisional patent application having the same title as above, having an application number of No. 60/419,031, and a filing date of Oct. 16, 2002.

BACKGROUND OF THE INVENTION

1. Technical Field of the Invention

The present invention relates generally to data communications and more particularly to high-speed wired data communications.

2. Description of Related Art

As is known, communication technologies that link electronic devices are many and varied, servicing communications via both physical media and wirelessly. Some communication technologies interface a pair of devices, other communication technologies interface small groups of devices, and still other communication technologies interface large groups of devices.

Examples of communication technologies that couple small groups of devices include buses within digital computers, e.g., PCI (peripheral component interface) bus, ISA (industry standard architecture) bus, an USB (universal serial bus), SPI (system packet interface) among others. One relatively new communication technology for coupling relatively small groups of devices is the HyperTransport (HT) technology, previously known as the Lightning Data Transport (LDT) technology (HyperTransport I/O Link Specification "HT Standard"). The HT Standard sets forth definitions for a high-speed, low-latency protocol that can interface with today's buses like AGP, PCI, SPI, 1394, USB 2.0, and 1 Gbit Ethernet as well as next generation buses including AGP 8x, Infiniband, PCI-X, PCI 3.0, and 10 Gbit Ethernet. HT interconnects provide high-speed data links between coupled devices. Most HT enabled devices include at least a pair of HT ports so that HT enabled devices may be daisy-chained. In an HT chain or fabric, each coupled device may communicate with each other coupled device using appropriate addressing and control. Examples of devices that may be HT chained include packet data routers, server computers, data storage devices, and other computer peripheral devices, among others.

Of these devices that may be HT chained together, many require significant processing capability and significant memory capacity. Thus, these devices typically include multiple processors and have a large amount of memory. While a device or group of devices having a large amount of memory and significant processing resources may be capable of performing a large number of tasks, significant operational difficulties exist in coordinating the operation of multiple processors. While each processor may be capable of executing a large number operations in a given time period, the operation of the processors must be coordinated and memory must be managed to assure coherency of cached copies. In a typical multi-processor installation, each processor typically includes a Level 1 (L1) cache coupled to a group of processors via a processor bus. The processor bus is most likely contained upon a printed circuit board. A Level 2 (L2) cache and a memory controller (that also couples to memory) also typically couples to the processor bus. Thus, each of the processors has access to the shared L2 cache and the memory controller and can snoop the processor bus for its cache coherency purposes. This multiprocessor installation (node) is generally accepted and functions well in many environments.

However, network switches and web servers often times require more processing and storage capacity than can be provided by a single small group of processors sharing a processor bus. Thus, in some installations, a plurality processor/memory groups (nodes) is sometimes contained in a single device. In these instances, the nodes may be rack mounted and may be coupled via a back plane of the rack. Unfortunately, while the sharing of memory by processors within a single node is a fairly straightforward task, the sharing of memory between nodes is a daunting task. Memory accesses between nodes are slow and severely degrade the performance of the installation. Many other shortcomings in the operation of multiple node systems also exist. These shortcomings relate to cache coherency operations, interrupt service operations, etc.

While HT links provide high-speed connectivity for the above-mentioned devices and in other applications, they are inherently inefficient in some ways. For example, in a "legal" HT chain, one HT enabled device serves as a host bridge while other HT enabled devices serve as dual link tunnels and a single HT enabled device sits at the end of the HT chain and serves as an end-of-chain device (also referred to as an HT "cave"). According to the HT Standard, all communications must flow through the host bridge, even if the communication is between two adjacent devices in the HT chain. Thus, if an end-of-chain HT device desires to communicate with an adjacent HT tunnel, its transmitted communications flow first upstream to the host bridge and then flow downstream from the host bridge to the adjacent destination device. Such communication routing, while allowing the HT chain to be well managed, reduces the overall throughput achievable by the HT chain, increases latency of operations, and reduces concurrency of transactions.

Applications, including the above-mentioned devices, that otherwise benefit from the speed advantages of the HT chain are hampered by the inherent delays and transaction routing limitations of current HT chain operations. Because all transactions are serviced by the host bridge and the host a limited number of transactions it can process at a given time, transaction latency is a significant issue for devices on the HT chain, particularly so for those devices residing at the far end of the HT chain, i.e., at or near the end-of-chain device. Further, because all communications serviced by the HT chain, both upstream and downstream, must share the bandwidth provided by the HT chain, the HT chain may have insufficient total capacity to simultaneously service all required transactions at their required bandwidth(s). Moreover, a limited number of transactions may be addressed at any time by any one device such as the host, e.g., 32 transactions (2**5). The host bridge is therefore limited in the number of transactions that it may have outstanding at any time and the host bridge may be unable to service all required transactions satisfactorily. Each of these operational limitations affects the ability of an HT chain to service the communications requirements of coupled devices.

Further, even if an HT enabled device were incorporated into a system (e.g., an HT enabled server, router, etc. were incorporated into an circuit-switched system or packet-switched system), it would be required to interface with a legacy device that uses an older communication protocol.

For example, if a line card were developed with HT ports, the line card would need to communicate with legacy line cards that include SPI ports.

Therefore, a need exists for methods and/or apparatuses for interfacing devices using one or more communication protocols in one or more configurations while overcoming the bandwidth limitations, latency limitations, limited concurrency, and other limitations associated with the use of a high-speed HT chain.

BRIEF SUMMARY OF THE INVENTION

The processing of received data by a multiple processor device of the present invention substantially meets these needs and others. In one embodiment, the multiple processor device stores a stream of data as a plurality of data segments. The stream of data includes multiplexed data fragments from at least one of a plurality of virtual channels (i.e., logical connections that are sharing a single physical link). The data segments that comprise the stream of data correspond to the multiplexed data fragments from the virtual channels. The multiple processor device then decodes at least one data segment in accordance with one of a plurality of transmission protocols (e.g., HyperTransport, PCI, SPI, et cetera) to produce a decoded data segment.

The multiple processor device then stores the decoded data segment to align it in accordance with a data path segment size. The data path segment size may be 8 bytes, 16 bytes and/or any other desired size. The alignment occurs when the data segment is of a size less than the data path segment size (e.g., the data segment is less than 8 bytes, 16 bytes, etc.). In an embodiment, the alignment of the data segment pads the data segment with null information such that the stored decoded data segment is of the desired data path segment size (e.g., 8 bytes, 16 bytes, et cetera). The multiple processor device then interprets the stored decoded data segment with respect to a corresponding one of the plurality of virtual channels to determine a destination of the stored decoded data segment. The destination may be an input queue within the packet manager, routing to one of the processor units via the node controller, and/or passing the data segment to the another interface module for transmission upstream or downstream to another multiple processing device. The multiple processor device then stores the decoded data segment as part of reassembled data (e.g., a reassembled packet in a generic format).

In an alternate embodiment, the multiple processor device stores the stream of data as a plurality of data segments. The multiple processor device then decodes at least one data segment in accordance with one of a plurality of data transmission protocols (e.g., HT, SPI, PCI, et cetera) to produce a decoded data segment. The multiple processor device then stores the decoded data segment, in a generic format (e.g., as an ATM cell, IP packet, TCP/IP packet or any other type of packet switched protocol or circuit switched protocol). The multiple processor device stores the decoded data segments, in the generic format, to reassemble at least a portion of a packet provided by one of the virtual channels. The multiple processor device then routes the decoded data segment as at least part of the reassembled packet to one of the plurality of destinations in accordance with the identified virtual channel.

In any embodiment of the present invention, the multiple processor device may interface with other multiple processor devices utilizing one or more communication protocols (e.g., HT, SPI, et cetera) in one or more configurations while overcoming bandwidth limitations, latency limitations and other limitations associated with the use of high speed chains.

BRIEF DESCRIPTION OF THE SEVERAL VIEWS OF THE DRAWINGS

FIG. 7 is a graphical representation of the processing performed by a transmitter media access control module and a receiver media access control module in accordance with the present invention;

DETAILED DESCRIPTION OF THE INVENTION

Figure 1:
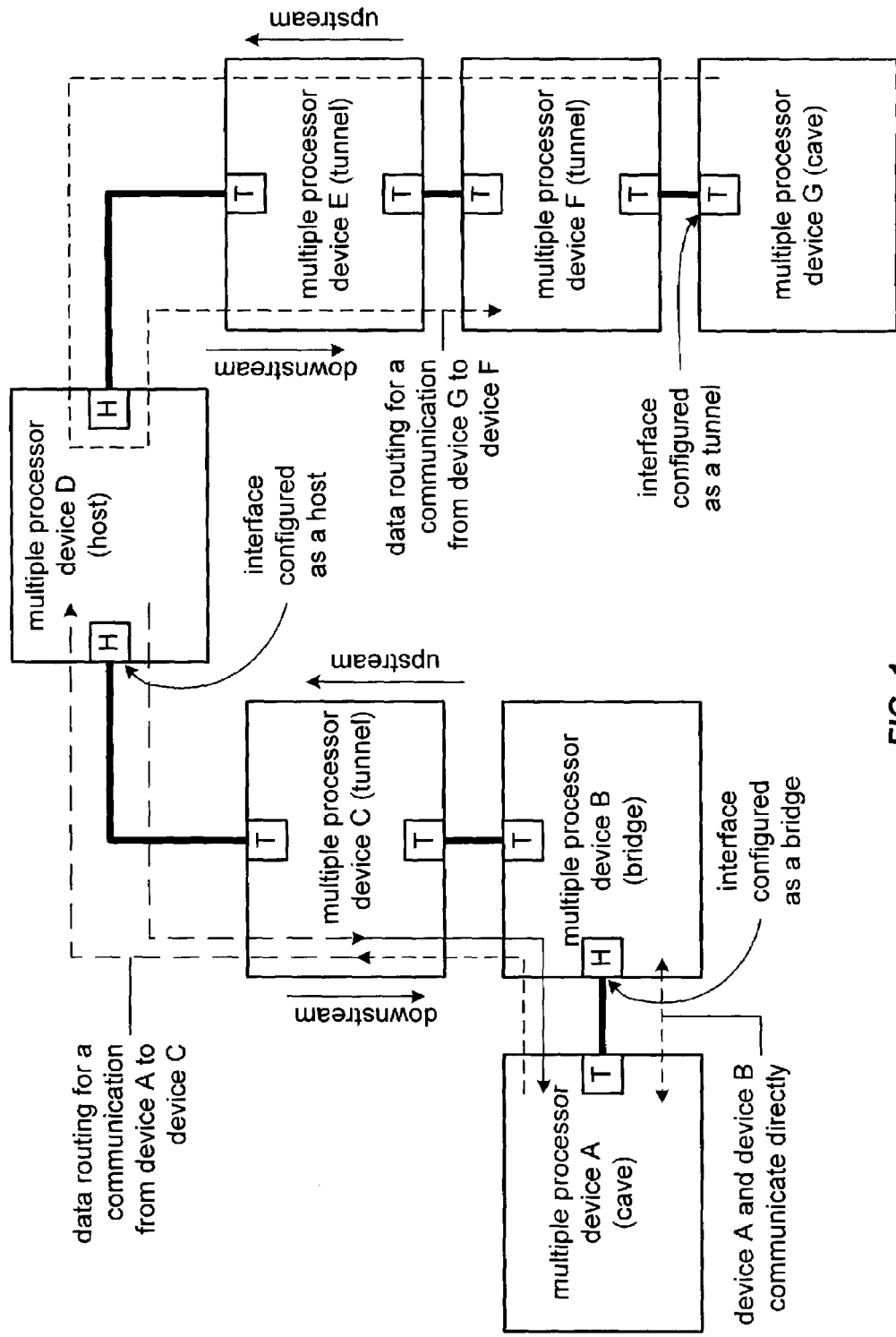
FIG. 1 is a schematic block diagram of a processing system in accordance with the present invention.

FIG. 1 is a schematic block diagram of a processing system 10 that includes a plurality of multiple processor devices A-G. Each of the multiple processor devices A-G include at least two interfaces, which, in this illustration, are labeled as T for tunnel functionality or H for host or bridge functionality. The details of the multiple processor devices A-G will be described in greater detail with reference to FIG. 4.

In this example of a processing system 10, multiple processor device D is functioning as a host to support two primary chains. The $1^{st}$ primary chain includes multiple processor device C, which is configured to provide a tunnel function, and multiple processor device B, which is configured to provide a bridge function. The other primary chain supported by device D includes multiple processor devices E and F, which are each configured to provide tunneling functionality, and multiple processor device G, which is configured to provide a cave function. The processing system 10 also includes a secondary chain that includes multiple processor devices A and B, where device A is configured to provide a cave function. Multiple processor device B functions as the host for the secondary chain. By convention, data from the devices (i.e., nodes) in a chain to the host device is referred to as upstream data and data from the host device to the node devices is referred to as downstream data.

In general, when a multiple processor device is providing a tunneling function, it passes, without interpretation, all packets received from downstream devices (i.e., the multiple processor devices that, in the chain, are further away from the host device) to the next upstream device (i.e., an adjacent multiple processor device that, in the chain, is closer to the host device). For example, multiple processor device E provides all upstream packets received from downstream multiple processor devices F and G to host device D without interpretation, even if the packets are addressing multiple processor device E. The host device D modifies the upstream packets to identify itself as the source of packets and sends the modified packets downstream along with any packets that it generated. As the multiple processor devices receive the downstream packets, they interpret the packet to identify the host device as the source and to identify a destination. If the multiple processor device is not the destination, it passes the downstream packets to the next downstream node. For example, packets received from the host device D that are directed to the multiple processor device E will be processed by the multiple processor device E, but device E will pass packets for devices F and G. The processing of packets by device E includes routing the packets to a particular processing unit within device E, routing to local memory, routing to external memory associated with device E, et cetera.

In this configuration, if multiple processor device G desires to send packets to multiple processor device F, the packets would traverse through devices E and F to host device D. Host device D modifies the packets identifying the multiple processor device D as the source of the packets and provides the modified packets to multiple processor device E, which would in turn forward them to multiple processor device F. A similar type of packet flow occurs for multiple processor device B communicating with multiple processor device C, for communications between devices G and E, and for communications between devices E and F.

For the secondary chain, devices A and B can communication directly, i.e., they support peer-to-peer communications therebetween. In this instance, the multiple processor device B has one of its interfaces (H) configured to provide a bridge function. Accordingly, the bridge functioning interface of device B interprets packets it receives from device A to determine the destination of the packet. If the destination is local to device B (i.e., meaning the destination of the packet is one of the modules within multiple processor device B or associated with multiple processor device B), the H interface processes the received packet. The processing includes forwarding the packet to the appropriate destination within, or associated with, device B.

If the packet is not destined for a module within device B, multiple processor device B modifies the packet to identify itself as the source of the packets. The modified packets are then forwarded to the host device D via device C, which is providing a tunneling function. For example, if device A desires to communicate with device C, device A provides packets to device B and device B modifies the packets to identify itself as the source of the packets. Device B then provides the modified packets to host device D via device C. Host device D then, in turn, modifies the packets to identify itself as the source of the packets and provides the again modified packets to device C, where the packets are subsequently processed. Conversely, if device C were to transmit packets to device A, the packets would first be sent to host D, modified by device D, and the modified packets would be provided back to device C. Device C, in accordance with the tunneling function, passes the packets to device B. Device B interprets the packets, identifies device A as the destination, and modifies the packets to identify device B as the source. Device B then provides the modified packets to device A for processing thereby.

In the processing system 10, device D, as the host, assigns a node ID (identification code) to each of the other multiple processor devices in the system. Multiple processor device D then maps the node ID to a unit ID for each device in the system, including its own node ID to its own unit ID. Accordingly, by including a bridging functionality in device B, in accordance with the present invention, the processing system 10 allows for interfacing between devices using one or more communication protocols and may be configured in one or more configurations while overcoming bandwidth limitations, latency limitations and other limitations associated with the use of high speed HyperTransport chains. Such communication protocols include, but are not limited to, a HyperTransport protocol, system packet interface (SPI) protocol and/or other types of packet-switched or circuit-switched protocols.

Figure 2:
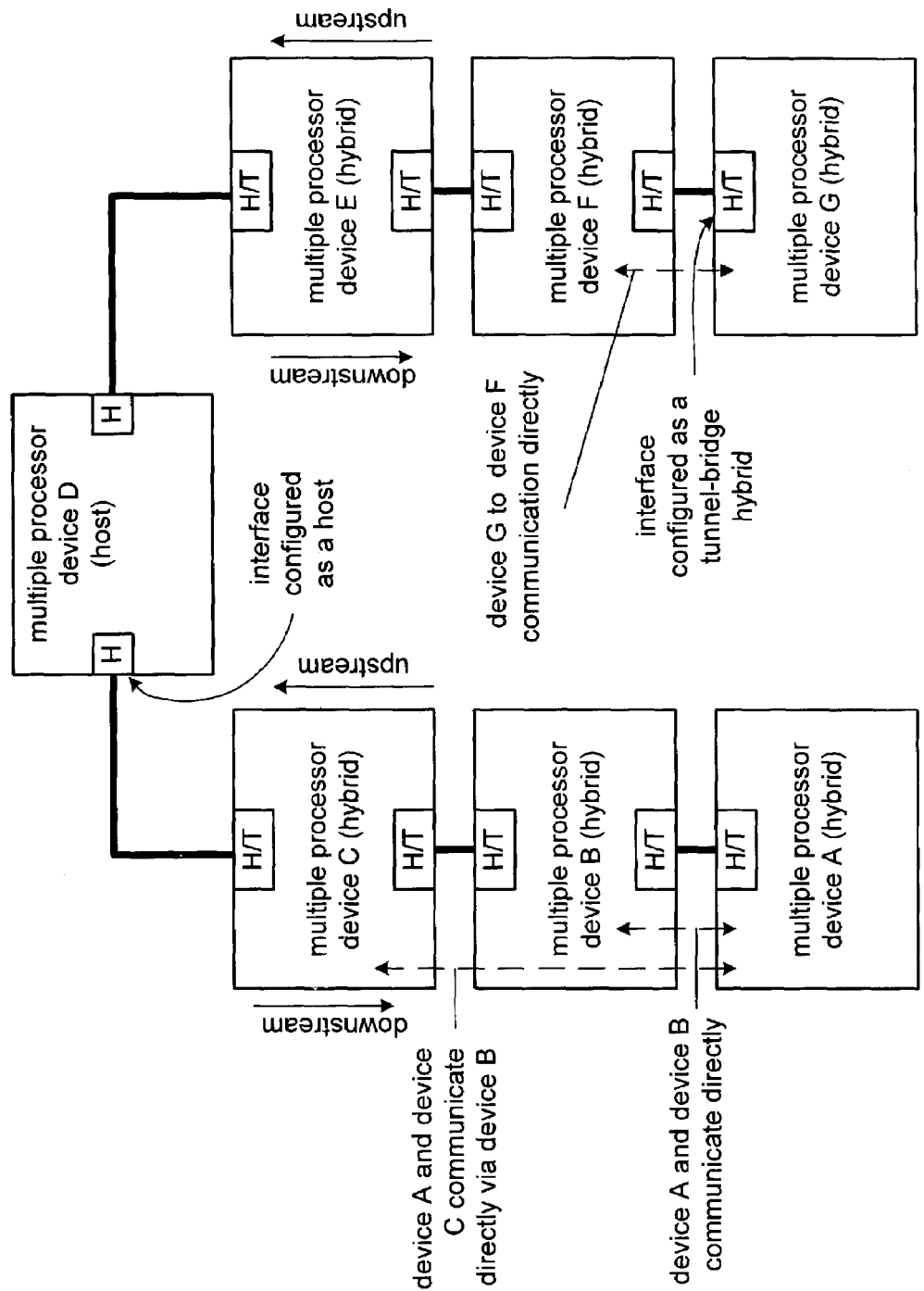
FIG. 2 is a schematic block diagram of an alternate processing system in accordance with the present invention.
Figure 4:
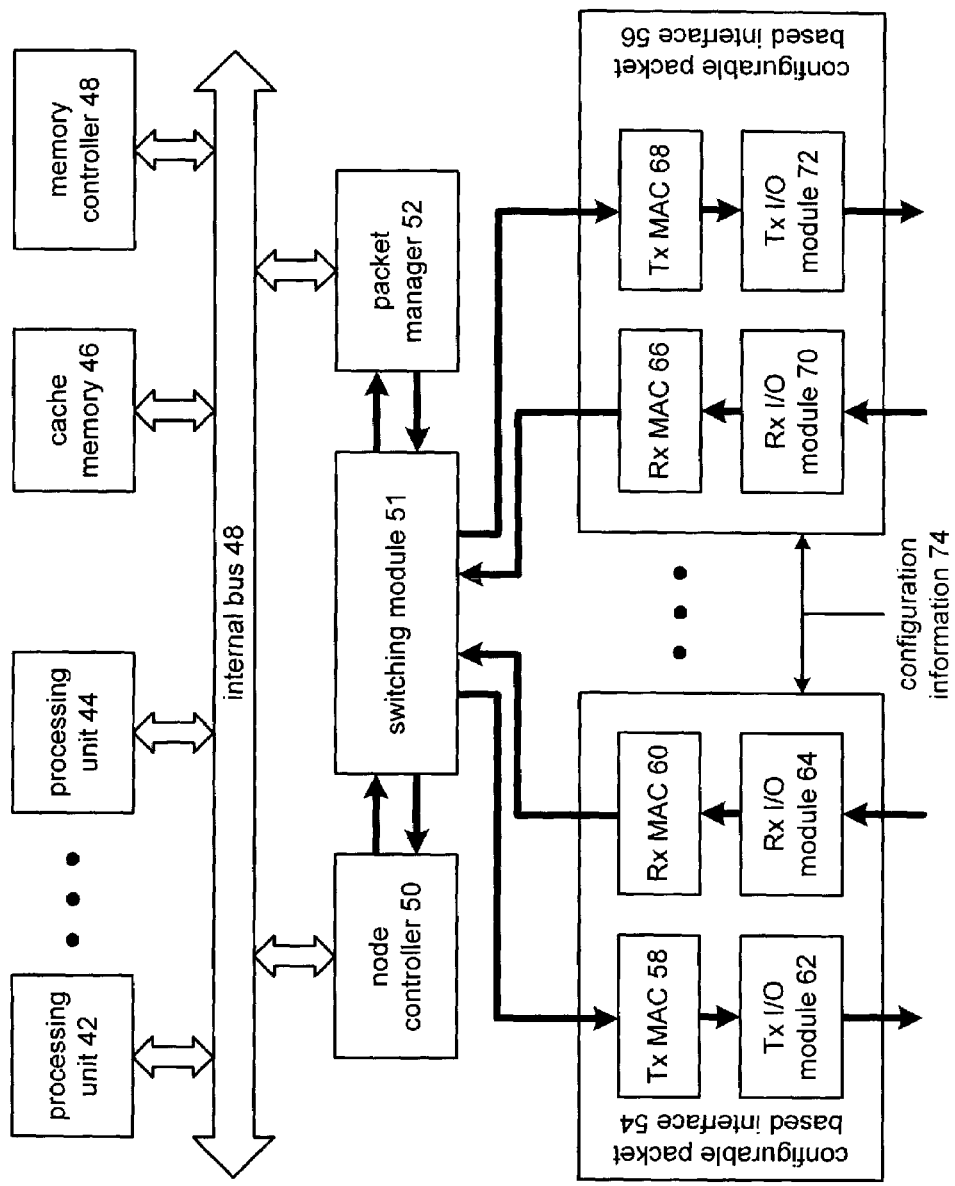
FIG. 4 is a schematic block diagram of a multiple processor device in accordance with the present invention.

FIG. 2 is a schematic block diagram of an alternate processing system 20 that includes a plurality of multiple processor devices A-G. In this system 20, multiple processor device D is the host device while the remaining devices are configured to support a tunnel-bridge hybrid interfacing functionality. Each of multiple processor devices A-C and E-G have their interfaces configured to support the tunnel-bridge hybrid (H/T) mode. With the interfacing configured in this manner, peer-to-peer communications may occur between multiple processor devices in a chain. For example, multiple processor device A may communicate directly with multiple processor device B and may communicate with multiple processor device C, via device B, without routing packets through the host device D. For peer-to-peer communication between devices A and B, multiple processor device B interprets the packets received from multiple processor device A to determine whether the destination of the packet is local to multiple processor device B. With reference to FIG. 4, a destination associated with multiple processor device B may be any one of the plurality of processing units 42-44, cache memory 46 or system memory accessible through the memory controller 48. Returning back to the diagram of FIG. 2, if the packets received from device A are destined for a module within device B, device B processes the packets by forwarding them to the appropriate module within device B. If the packets are not destined for device B, device B forwards them, without modifying the source of the packets, to multiple processor device C. As such, for this example, the source of packets remains device A.

The packets received by multiple processor device C are interpreted to determine whether a module within multiple processor device C is the destination of the packets. If so, device C processes them by forwarding the packets to the appropriate module within, or associated with, device C. If the packets are not destined for a module within device C, device C forwards them to the multiple processor device D. Device D modifies the packets to identify itself as the source of the packets and provides the modified packets to the chain including devices E-G. Note that device C, having interpreted the packets, passes only packets that are destined for a device other than itself in the upstream direction. Since device D is the only upstream device for the primary chain that includes device C, device D knows, based on the destination address, that the packets are for a device in the other primary chain.

Devices E-G, in order, interpret the modified packets to determine whether it is a destination of the modified packets. If so, the device processes the packets. If not, the device routes the packets to the next device in chain. In addition, devices E-G support peer-to-peer communications in a similar manner as devices A-C. Accordingly, by configuring the interfaces of the devices to support a tunnel-bridge hybrid function, the source of the packets is not modified (except when the communications are between primary chains of the system), which enables the devices to use one or more communication protocols (e.g., HyperTransport, system packet interface, et cetera) in a peer-to-peer configuration that substantially overcomes the bandwidth limitations, latency limitations and other limitations associated with the use of a conventional highspeed HyperTransport chain.

In general, a device configured as a tunnel-bridge hybrid has knowledge about which direction to send requests. For example, for device C to communicate with device A, device C knows that device A is downstream and is coupled to device B. As such, device C sends packets to device B for forwarding to device A as opposed to a traditional tunnel function, where device C would have to send packets for device A to device D, where device D would provide them back downstream after redefining itself as the source of the packets. To facilitate the more direct communications, each device maintains the address ranges, in range registers, for each link (or at least one of its links) and enforces ordering rules regardless of the Unit ID across its interfaces.

To facilitate the tunnel-hybrid functionality, since each device receives a unique Node ID, request packets are generated with the device's unique Node ID in the a Unit ID field of the packet. For packets that are forwarded upstream (or downstream), the Unit ID field and the source ID field of the request packets are preserved. As such, when the target device receives a request packet, the target device may accept the packet based on the address.

When the target device generates a response packet in response to a request packet(s), it uses the unique Node ID of the requesting device rather than the Node ID of the responding device. In addition, the responding device also preserves the Source Tag of the requesting device such that the response packet includes the Node ID and Source Tag of the requesting device. This enables the response packets to be accepted based on the Node ID rather than based on a bridge bit or direction of travel of the packet.

For a device to be configured as a tunnel-bridge hybrid, it export, at configuration of the system 20, a type 1 header (i.e., a bridge header in accordance with the HT specification) in addition to, or in place of, a type 0 header (i.e., a tunnel header in accordance with the HT specification). In response to the type 1 header, the host device programs the address range registers of the devices A-C and E-G regarding one or more links coupled to the devices. Once configured, the device utilizes the addresses in its address range registers to identify the direction (i.e., upstream link or downstream link) to send request packets and/or response packets to a particular device as described above.

Figure 3:
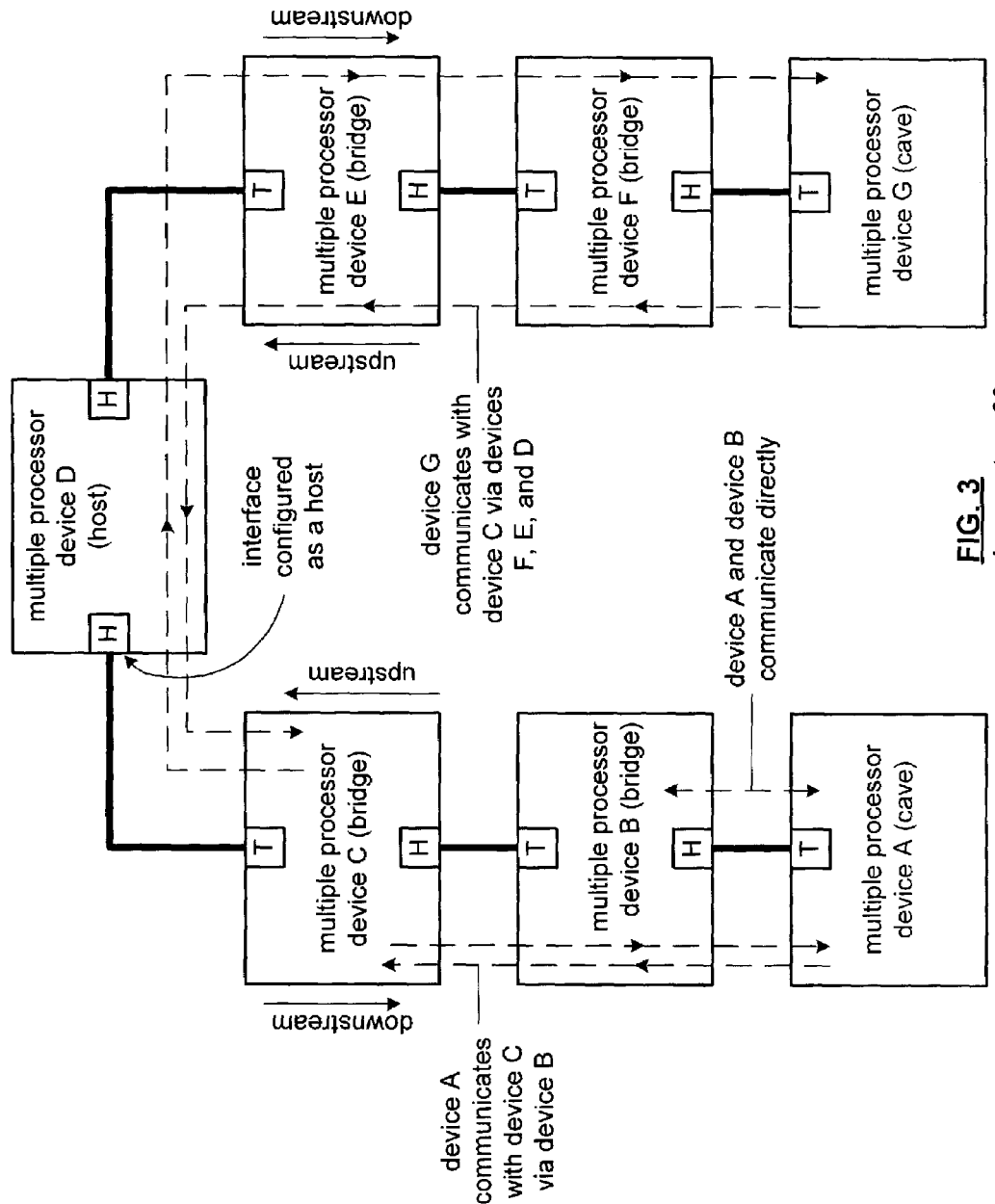
FIG. 3 is a schematic block diagram of another processing system in accordance with the present invention.

FIG. 3 is a schematic block diagram of processing system 30 that includes multiple processor devices A-G. In this embodiment, multiple processor device D is functioning as a host device for the system while the multiple processor devices B, C, E and F are configured to provide bridge functionality and devices A and G are configured to support a cave function. In this configuration, each of the devices may communicate directly (i.e., have peer-to-peer communication) with adjacent multiple processor devices via cascaded secondary chains. For example, device A may directly communicate with device B via a secondary chain therebetween, device B may communicate directly with device C via a secondary chain therebetween, device E may communicate directly with device F via a secondary chain therebetween, and device F may communicate directly with device G via a secondary chain therebetween. The primary chains in this example of a processing system exist between device D and device C and between device D and device E.

For communication between devices A and B, device B interprets packets received from device A to determine their destination. If device B is the destination, it processes it by providing it to the appropriate destination within, or associated with, device B. If a packet is not destined for device B, device B modifies the packet to identify itself as the source and forwards it to device C. Accordingly, if device A desires to communicate with device B, it does so directly since device B is providing a bridge function with respect to device A. However, for device A desires to communicate with device C, device B, as the host for the chain between devices A and B, modifies the packets to identify itself as the source of the packets. The modified packets are then routed to device C. To device C, the packets appear to be sourced from device B and not device A. For packets from device C to device A, device B modifies the packets to identify itself as the source of the packets and provides the modified packets to device A. In such a configuration, each device only knows that it is communicating with one device in the downstream direct and one device in the upstream direction. As such, peer-to-peer communication is supported directly between adjacent devices and is also supported indirectly (i.e., by modifying the packets to identify the host of the secondary chain as the source of the packets) between any devices in the system.

In any of the processing systems illustrated in FIGS. 1-3, the devices on one chain may communicate with devices on the other chain. An example of this is illustrated in FIG. 3 where device G may communicate with device C. As shown, packets from device G are propagated through devices D, E and F until they reach device C. Similarly, packets from device C are propagated through devices D, E and F until they reach device G. In the example of FIG. 3, the packets in the downstream direction and in the upstream direction are adjusted to modify the source of the packets. Accordingly, packets received from device G appear, to device C, to be originated by device D. Similarly, packets from device C appear, to device G, to be sourced by device F. As one of average skill in the art will appreciate, each device that is providing a host function or a bridge function maintains a table of communications for the chains it is the host to track the true source of the packets and the true destination of the packets.

FIG. 4 is a schematic block diagram of a multiple processor device 40 in accordance with the present invention. The multiple processor device 40 may be an integrated circuit or it may be constructed from discrete components. In either implementation, the multiple processor device 40 may be used as multiple processor device A-G in the processing systems illustrated in FIGS. 1-3.

The multiple processor device 40 includes a plurality of processing units 42-44, cache memory 46, memory controller 48, which interfaces with on and/or off-chip system memory, an internal bus 48, a node controller 50, a switching module 51, a packet manager 52, and a plurality of configurable packet based interfaces 54-56 (only two shown). The processing units 42-44, which may be two or more in numbers, may have a MIPS based architecture, to support floating point processing and branch prediction. In addition, each processing unit 42-44 may include a memory sub-system of an instruction cache and a data cache and may support separately, or in combination, one or more processing functions. With respect to the processing system of FIGS. 1-3, each processing unit 42-44 may be a destination within multiple processor device 40 and/or each processing function executed by the processing modules 42-44 may be a destination within the processor device 40.

The internal bus 48, which may be a 256 bit cache line wide split transaction cache coherent bus, couples the processing units 42-44, cache memory 46, memory controller 48, node controller 50 and packet manager 52 together. The cache memory 46 may function as an L2 cache for the processing units 42-44, node controller 50 and/or packet manager 52. With respect to the processing system of FIGS. 1-3, the cache memory 46 may be a destination within multiple processor device 40.

The memory controller 48 provides an interface to system memory, which, when the multiple processor device 40 is an integrated circuit, may be off-chip and/or on-chip. With respect to the processing system of FIGS. 1-3, the system memory may be a destination within the multiple processor device 40 and/or memory locations within the system memory may be individual destinations within the device 40. Accordingly, the system memory may include one or more destinations for the processing systems illustrated in FIGS. 1-3.

The node controller 50 functions as a bridge between the internal bus 48 and the configurable packet-based interfaces 54-56. Accordingly, accesses originated on either side of the node controller will be translated and sent on to the other. The node controller also supports the distributed shared memory model associated with the cache coherency non-uniform memory access (CC-NUMA) protocol.

The switching module 51 couples the plurality of configurable packet-based interfaces 54-56 to the node controller 50 and/or to the packet manager 52. The switching module 51 functions to direct data traffic, which may be in a generic format, between the node controller 50 and the configurable packet-based interfaces 54-56 and between the packet manager 52 and the configurable packet-based interfaces 54. The generic format may include 8 byte data words or 16 byte data words formatted in accordance with a proprietary protocol, in accordance with asynchronous transfer mode (ATM) cells, in accordance with internet protocol (IP) packets, in accordance with transmission control protocol/internet protocol (TCP/IP) packets, and/or in general, in accordance with any packet-switched protocol or circuit-switched protocol.

The packet manager 52 may be a direct memory access (DMA) engine that writes packets received from the switching module 51 into input queues of the system memory and reads packets from output queues of the system memory to the appropriate configurable packet-based interface 54-56. The packet manager 52 may include an input packet manager and an output packet manager each having its own DMA engine and associated cache memory. The cache memory may be arranged as first in first out (FIFO) buffers that respectively support the input queues and output queues.

The configurable packet-based interfaces 54-56 generally function to convert data from a high-speed communication protocol (e.g., HT, SPI, etc.) utilized between multiple processor devices 40 and the generic format of data within the multiple processor devices 40. Accordingly, the configurable packet-based interface 54 or 56 may convert received HT or SPI packets into the generic format packets or data words for processing within the multiple processor device 40. In addition, the configurable packet-based interfaces 54 and/or 56 may convert the generic format data received from the switching module 51 into HT packets or SPI packets. The particular conversion of packets to generic formatted data performed by the configurable packet-based interfaces 54 and 56 is based on configuration information 74, which, for example, indicates configuration for HT to generic format conversion or SPI to generic format conversion.

Each of the configurable packet-based interfaces 54-56 includes a transmit media access controller (Tx MAC) 58 or 68, a receiver (Rx) MAC 60 or 66, a transmitter input/output (I/O) module 62 or 72, and a receiver input/output (I/O) module 64 or 70. In general, the transmit MAC module 58 or 68 functions to convert outbound data of a plurality of virtual channels in the generic format to a stream of data in the specific high-speed communication protocol (e.g., HT, SPI, etc.) format. The transmit I/O module 62 or 72 generally functions to drive the high-speed formatted stream of data onto the physical link coupling the present multiple processor device 40 to another multiple processor device. The transmit I/O module 62 or 72 is further described, and incorporated herein by reference, in co-pending patent application entitled MULTI-FUNCTION INTERFACE AND APPLICATIONS THEREOF, having an attorney docket number of BP 2389, and having the same filing date and priority date as the present application. The receive MAC module 60 or 66 generally functions to convert the received stream of data from the specific high-speed communication protocol (e.g., HT, SPI, etc.) format into data from a plurality of virtual channels having the generic format. The receive I/O module 64 or 70 generally functions to amplify and time align the high-speed formatted steam of data received via the physical link coupling the present multiple processor device 40 to another multiple processor device. The receive I/O module 64 or 70 is further described, and incorporated herein by reference, in co-pending patent application entitled RECEIVER MULTI-PROTOCOL INTERFACE AND APPLICATIONS THEREOF, having an attorney docket number of BP 2389.1, and having the same filing date and priority date as the present application.

The transmit and/or receive MACs 58, 60, 66 and/or 68 may include, individually or in combination, a processing module and associated memory to perform its correspond functions. The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory stores, and the processing module executes, operational instructions corresponding to the functionality performed by the transmitter MAC 58 or 68 as disclosed, and incorporated herein by reference, in co-pending patent application entitled TRANSMITTING DATA FROM A PLURALITY OF VIRTUAL CHANNELS VIA A MULTIPLE PROCESSOR DEVICE, having an attorney docket number of BP 2184.1 and having the same filing date and priority date as the present patent application and corresponding to the functionality performed by the receiver MAC module 60 or 66 as further described in FIGS. 6-10.

In operation, the configurable packet-based interfaces 54-56 provide the means for communicating with other multiple processor devices 40 in a processing system such as the ones illustrated in FIG. 1, 2 or 3. The communication between multiple processor devices 40 via the configurable packet-based interfaces 54 and 56 is formatted in accordance with a particular high-speed communication protocol (e.g., HyperTransport (HT) or system packet interface (SPI)). The configurable packet-based interfaces 54-56 may be configured to support, at a given time, one or more of the particular high-speed communication protocols. In addition, the configurable packet-based interfaces 54-56 may be configured to support the multiple processor device 40 in providing a tunnel function, a bridge function, or a tunnel-bridge hybrid function.

When the multiple processor device 40 is configured to function as a tunnel-hybrid node, the configurable packet-based interface 54 or 56 receives the high-speed communication protocol formatted stream of data and separates, via the MAC module 60 or 68, the stream of incoming data into generic formatted data associated with one or more of a plurality a particular virtual channels. The particular virtual channel may be associated with a local module of the multiple processor device 40 (e.g., one or more of the processing units 42-44, the cache memory 46 and/or memory controller 48) and, accordingly, corresponds to a destination of the multiple processor device 40 or the particular virtual channel may be for forwarding packets to the another multiple processor device.

The interface 54 or 56 provides the generically formatted data words, which may comprise a packet, or portion thereof, to the switching module 51, which routes the generically formatted data words to the packet manager 52 and/or to node controller 50. The node controller 50, the packet manager 52 and/or one or more processing units 42-44 interprets the generically formatted data words to determine a destination therefor. If the destination is local to multiple processor device 40 (i.e., the data is for one of processing units 42-44, cache memory 46 or memory controller 48), the node controller 50 and/or packet manager 52 provides the data, in a packet format, to the appropriate destination. If the data is not addressing a local destination, the packet manager 52, node controller 50 and/or processing unit 42-44 causes the switching module 51 to provide the packet to one of the other configurable packet-based interfaces 54 or 56 for forwarding to another multiple processor device in the processing system. For example, if the data were received via configuration packet-based interface 54, the switching module 51 would provide the outgoing data to configurable packet-based interface 56. In addition, the switching module 51 provides outgoing packets generated by the local modules of processing module device 40 to one or more of the configurable packet-based interfaces 54-56.

The configurable packet-based interface 54 or 56 receives the generic formatted data via the transmitter MAC module 58 or 68. The transmitter MAC module 58, or 68 converts the generic formatted data from a plurality of virtual channels into a single stream of data. The transmitter input/output module 62 or 72 drives the stream of data on to the physical link coupling the present multiple processor device to another.

When the multiple processor device 40 is configured to function as a tunnel node, the data received by the configurable packet-based interfaces 54 from a downstream node is routed to the switching module 51 and then subsequently routed to another one of the configurable packet-based interfaces for transmission upstream without interpretation. For downstream transmissions, the data is interpreted to determine whether the destination of the data is local. If not, the data is routed downstream via one of the configurable packet-based interfaces 54 or 56.

When the multiple processor device 40 is configured as a bridge node, upstream packets that are received via a configurable packet-based interface 54 are modified via the interface 54, interface 56, the packet manager 52, the node controller 50, and/or processing units 42-44 to identify the current multiple processor device 40 as the source of the data. Having modified the source, the switching module 51 provides the modified data to one of the configurable packet-based interfaces for transmission upstream. For downstream transmissions, the multiple processor device 40 interprets the data to determine whether it contains the destination for the data. If so, the data is routed to the appropriate destination. If not, the multiple processor device 40 forwards the packet via one of the configurable packet-based interfaces 54 or 56 to a downstream device.

To determine the destination of the data, the node controller 50, the packet manager 52 and/or one of the processing units 42 or 44 interprets header information of the data to identify the destination (i.e., determines whether the target address is local to the device). In addition, a set of ordering rules of the received data is applied when processing the data, where processing includes forwarding the data, in packets, to the appropriate local destination or forwarding it onto another device. The ordering rules include the HT specification ordering rules and rules regarding non-posted commands being issued in order of reception. The rules further include that the interfaces are aware of whether they are configured to support a tunnel, bridge, or tunnel-bridge hybrid node. With such awareness, for every ordered pair of transactions, the receiver portion of the interface will not make a new transaction of an ordered pair visible to the switching module until the old transaction of an ordered pair has been sent to the switching module. The node controller, in addition to adhering to the HT specified ordering rules, treats all HT transactions as being part of the same input/output stream, regardless of which interface the transactions was received from. Accordingly, by applying the appropriate ordering rules, the routing to and from the appropriate destinations either locally or remotely is accurately achieved.

Figure 5:
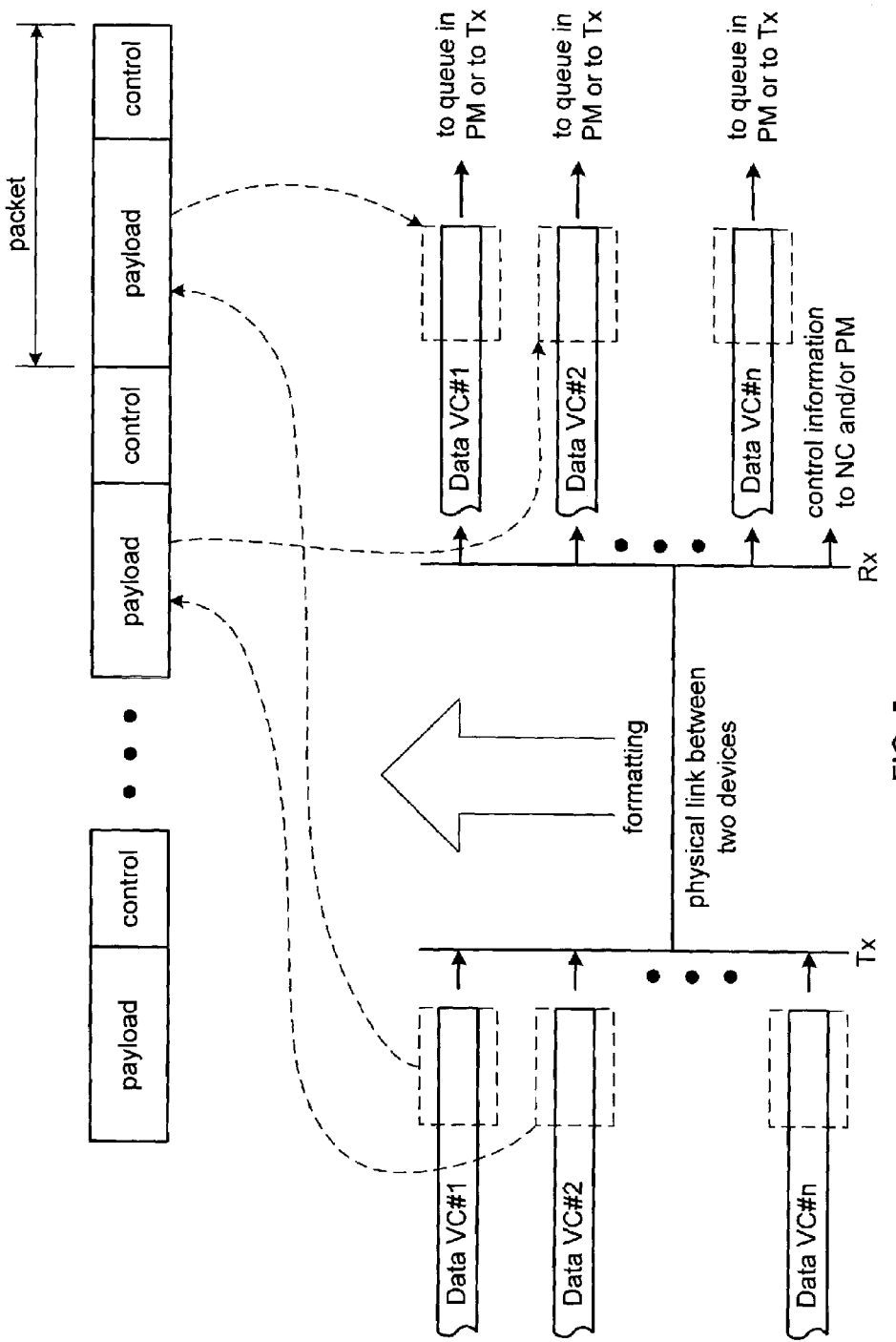
FIG. 5 is a graphical representation of transporting data between devices in accordance with the present invention.

FIG. 5 is a graphical representation of the functionality performed by the node controller 50, the switching module 51, the packet manager 52 and/or the configurable packet-based interfaces 54 and 56. In this illustration, data is transmitted over a physical link between two devices in accordance with a particular high-speed communication protocol (e.g., HT, SPI-4, etc.). Accordingly, the physical link supports a protocol that includes a plurality of packets. Each packet includes a data payload and a control section. The control section may include header information regarding the payload, control data for processing the corresponding payload of a current packet, previous packet(s) or subsequent packet(s), and/or control data for system administration functions.

Within a multiple processor device, a plurality of virtual channels may be established. A virtual channel may correspond to a particular physical entity, such as processing units 42-44, cache memory 46 and/or memory controller 48, and/or to a logical entity such as a particular algorithm being executed by one or more of the processing modules 42-44, particular memory locations within cache memory 46 and/or particular memory locations within system memory accessible via the memory controller 48. In addition, one or more virtual channels may correspond to data packets received from downstream or upstream nodes that require forwarding. Accordingly, each multiple processor device supports a plurality of virtual channels. The data of the virtual channels, which is illustrated as data virtual channel number 1 (VC#1), virtual channel number 2 (VC#2) through virtual channel number N (VC#n) may have a generic format. The generic format may be 8 byte data words, 16 byte data words that correspond to a proprietary protocol, ATM cells, IP packets, TCP/IP packets, other packet switched protocols and/or circuit switched protocols.

As illustrated, a plurality of virtual channels is sharing the physical link between the two devices. The multiple processor device 40, via one or more of the processing units 42-44, node controller 50, the interfaces 54-56, and/or packet manager 52 manages the allocation of the physical link among the plurality of virtual channels. As shown, the payload of a particular packet may be loaded with one or more segments from one or more virtual channels. In this illustration, the $1^{st}$ packet includes a segment, or fragment, of virtual channel number 1. The data payload of the next packet receives a segment, or fragment, of virtual channel number 2. The allocation of the bandwidth of the physical link to the plurality of virtual channels may be done in a round-robin fashion, a weighted round-robin fashion or some other application of fairness. The data transmitted across the physical link may be in a serial format and at extremely high data rates (e.g., 3.125 gigabits-per-second or greater), in a parallel format, or a combination thereof (e.g., 4 lines of 3.125 Gbps serial data).

At the receiving device, the stream of data is received and then separated into the corresponding virtual channels via the configurable packet-based interface, the switching module 51, the node controller 50, the interfaces 54-56, and/or packet manager 52. The recaptured virtual channel data is either provided to an input queue for a local destination or provided to an output queue for forwarding via one of the configurable packet-based interfaces to another device. Accordingly, each of the devices in a processing system as illustrated in FIGS. 1-3 may utilize a high speed serial interface, a parallel interface, or a plurality of high speed serial interfaces, to transceive data from a plurality of virtual channels utilizing one or more communication protocols and be configured in one or more configurations while substantially overcoming the bandwidth limitations, latency limitations, limited concurrency (i.e., renaming of packets) and other limitations associated with the use of a high speed HyperTransport chain. Configuring the multiple processor devices for application in the multiple configurations of processing systems is described in greater detail and incorporated herein by reference in co-pending patent application entitled MULTIPLE PROCESSOR INTEGRATED CIRCUIT HAVING CONFIGURABLE PACKET-BASED INTERFACES, having an attorney docket number of BP 2186, and having the same filing date and priority date as the present patent application.

Figure 6:
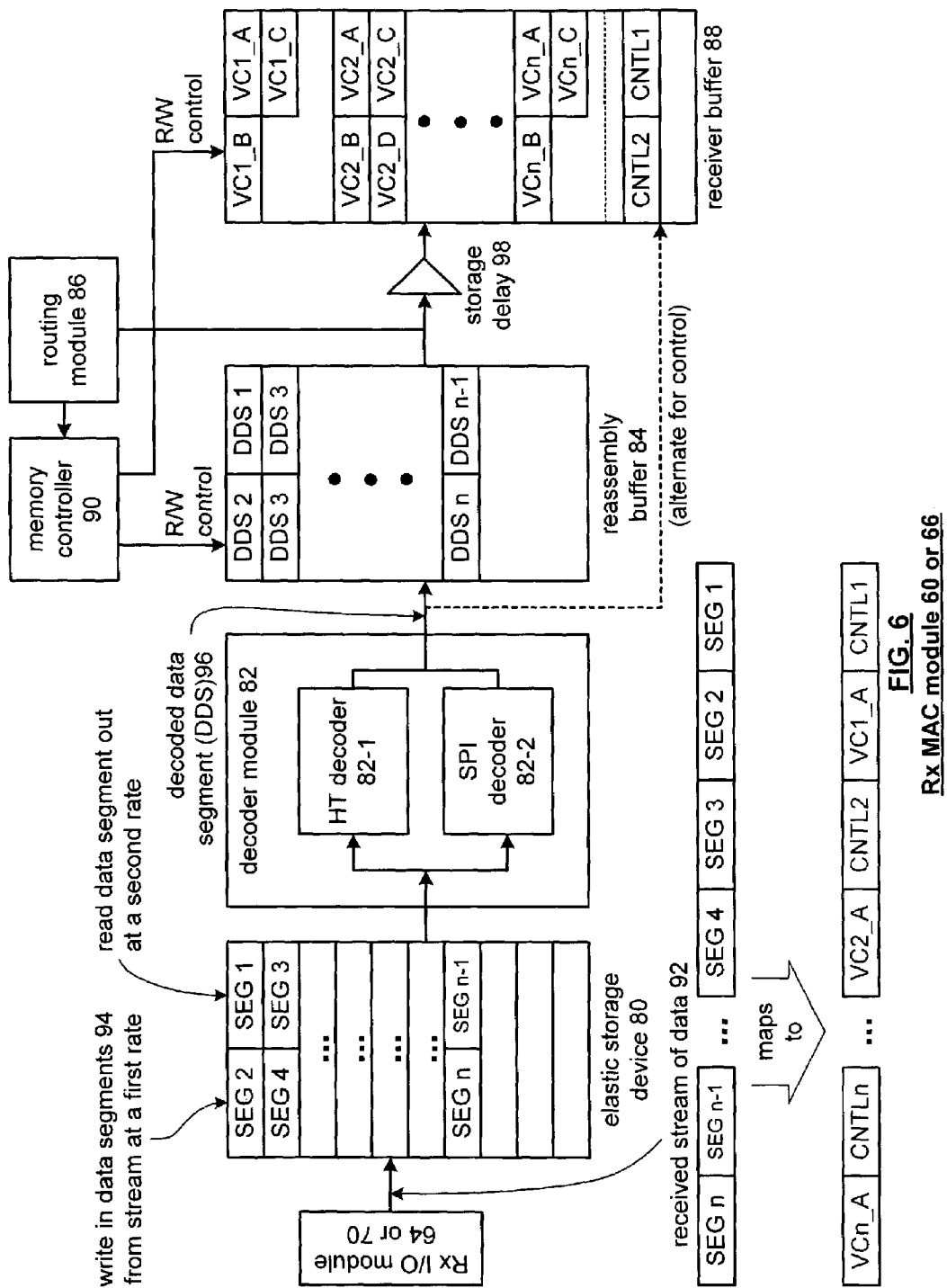
FIG. 6 is a schematic block diagram of a receiver media access control module in accordance with the present invention.

FIG. 6 is a schematic block diagram of a receiver media access control (MAC) module 60 or 68. The receiver MAC module includes an elastic storage device 80, a decoder module 82, a reassembly buffer 84, a storage delay element 98, a receiver buffer 88, a routing module 86, and a memory controller 90. The decoder module 82 may include a HyperTransport (HT) decoder 82-1 and a system packet interface (SPI) decoder 82-2.

The elastic storage device 80 is operably coupled to receive a stream of data 92 from the receiver input/output module 64 or 70. The received stream of data 92 includes a plurality of data segments (e.g., SEG1-SEG n). The data segments within the stream of data 92 correspond to control information and/or data from a plurality of virtual channels. The particular mapping of control information and data from virtual channels to produce the stream of data 92 will be discussed in greater detail with reference to FIG. 7. The elastic storage device 80, which may be a dual port SRAM, DRAM memory, register file set, or other type of memory device, stores the data segments 94 from the stream at a $1^{st}$ data rate. For example, the data may be written into the elastic storage device 80 at a rate of 64 bits at a 400 megahertz rate. The decoder module 82 reads the data segments out of the elastic storage device 80 at a $2^{nd}$ data rate in predetermined data segment sizes (e.g., 8 or 16 byte segments).

The stream of data 92 is partitioned into segments for storage in the elastic storage device 80. The decoder module 82, upon retrieving data segments from the elastic storage device 80, decodes the data segments to produce decoded data segments (DDS) 96. The decoding may be done in accordance with the HyperTransport protocol via the HT decoder 82-1 or in accordance with the SPI protocol via the SPI decoder 82-2. Accordingly, the decoder module 82 is taking the segments of binary encoded data and decodes the data to begin the reassembly process of recapturing the originally transmitted data packets.

The reassembly buffer 84 stores the decoded data segments 96 in a first-in-firstout manner. In addition, if the corresponding decoded data segment 96 is less than the data path segment size (e.g., 8 bytes, 16 bytes, et cetera), the reassembly buffer 84 pads the decoded data segment with the data path segment size. In other words, if, for example, the data path segment size is 8 bytes and the particular decoded data segment 96 is 6 bytes, the reassembly buffer 84 will pad the decoded data segment 96 with 2 bytes of null information such that it is the same size as the corresponding data path segment. Further, the reassembly buffer aligns the data segments to correspond with desired word boundaries. For example, assume that the desired word includes 16 bytes of information and the boundaries are byte 0 and byte 15. However, in a given time frame, the bytes that are received correspond to bytes 14 and 15 from one word and bytes 0-13 of another word. In the next time frame, the remaining two bytes (i.e., 14 and 15) are received along with the first 14 bytes of the next word. The reassembly buffer aligns the received data segments such that full words are received in the given time frames (i.e., receive bytes 0 through 15 of the same word as opposed to bytes from two different words). Still further, the reassembly buffer 84 buffers the decoded data segments 96 to overcome inefficiencies in converting high-speed minimal bit data to slower-speed multiple bit data. Such functionality of the reassembly buffer ensures that the reassembly of data packets will be accurate.

The decoder module 82 may treat control information and data from virtual channels alike or differently. When the decoder module 82 treats the control information and data of the virtual channels similarly, the decoded data segments 96, which may include a portion of data from a virtual channel or control information, is stored in the reassembly buffer 84 in a first-in-first-out manner. Alternatively, the decoder module 82 may detect control information separately and provide the control information to the receiver buffer 88 thus bypassing the reassembly buffer 84. In this alternative embodiment, the decoder module 82 provides the data of the virtual channels to the reassembly buffer 84 and the control information to the receiver buffer 88.

The routing module 86 interprets the decoded data segments 96 as they are retrieved from the reassembly buffer 84. The routing module interprets the data segments to determine which virtual channel they are associated with and/or for which piece of control information they are associated with. The resulting interpretation is provided to the memory controller 90, which, via read write controls causes the decoded data segments to be stored in a location of the receiver buffer 88 allocated for the particular virtual channel or control information. The storage delay element 98 compensates for the processing time of the routing module 86 to determine the appropriate storage location within the receiver buffer 88.

The receiver buffer 88 may be a static random access memory (SRAM) or dynamic random access memory (DRAM) and may include one or more memory devices. In particular, the receiver buffer 88 may include a separate memory device for storing control information and separate memory device for storing information from the virtual channels. Once at least a portion of a packet of a particular virtual channel is stored in the receiver buffer 88, it may be routed to an input queue in the packet manager or routed to an output queue for routing, via another interface 54 or 56, as an upstream packet or a downstream packet to another multiple processor device.

FIG. 6 further illustrates an example of the processing performed by the receiver MAC module 60 or 68. In the example, data segment 1 of the received stream of data 92 corresponds with control information CNTL 1. The elastic storage device 80, stores data segment 1, which, with respect to the receiver MAC module, is a set number of bytes of data (e.g., 8 bytes, 16 bytes, et cetera). The decoder module 82 decodes data segment 1 to determine that segment 1 corresponds to control information. The decoded data segment is then stored in the reassembly buffer 84 or provided to the receiver buffer 88. If the decode control information segment is provided to the reassembly buffer 84, it is stored in a first-in-first-out (FIFO) manner. At some later time, the decoded control information segment is read from the reassembly buffer 84 by the routing module 86 and interpreted to determine that it is control information associated with a particular packet or particular control function. Based on this interpretation, the decoded data segment 1 is stored in a particular location of the receiver buffer 88.

Continuing with the example, the $2^{nd}$ data segment (SEG2) corresponds to a $1^{st}$ portion of data transmitted by virtual channel number 1. This data is stored as binary information in the elastic storage device 80 as a fixed number of binary bits (e.g., 8 bytes, 16 bytes, etc.). The decoder module 82 decodes the binary bits to produce the decoded data segment 96, which, for this example, corresponds to DDS2. When the decoded data segment (DDS2) is read from the reassembly buffer 84, the routing module 86 interprets it to determine that it corresponds to a packet transmitted from virtual channel number 1. Based on this interpretation, the portion of receiver buffer 88 corresponding to virtual channel number 1 will be addressed via the memory controller 90 such that the decoded data segment number 2 will be stored, as VC1_A in the receiver buffer 88. The remaining data segments illustrated in FIG. 6 are processed in a similar manner. Accordingly, by the time the data is stored in the receiver buffer 88, the stream of data 92 is decoded and segregated into control information and data information, where the data information is further segregated based on the virtual channels that transmitted it. As such, when the data is retrieved from the receiver buffer 88, it is in a generic format and partitioned based on the particular virtual channels that transmitted it.

FIG. 7 is a graphical representation of the function of the transmit MAC 58 or 68 and the receive MAC modules 60 or 66. The transmit MAC module 58 or 68 receives packets from a plurality of virtual channels via the switching module 51. FIG. 7 illustrates the packets received by the transmit MAC module 58 or 68 from a $1^{st}$ virtual channel (VC1). The data are shown in a generic format, which may correspond to ATM cells, frame relay packets, IP packets, TCP/IP packets, other types of packet switched formatting and/or circuit switched formatting. The transmit MAC module partitions the generically formatted packets into a plurality of data segments of a particular size. For example, the $1^{st}$ data packet of virtual channel 1 is partitioned into three segments VC1_A, VC1_B and VC1_C. The particular size of the data segments corresponds with the desired data path size, which may be 8 bytes, 16 bytes, et cetera.

The $1^{st}$ data segment for packet 1 (VC1_A) will include a start-of-packet indication for packet 1. The $3^{rd}$ data segment of packet 1 (VC1_C) will include an end-of-packet indication for packet 1. Since VC1_C corresponds to the last data segment of packet 1 it may be of a size less than the desired data segment size (e.g., of 8 bytes, 16 bytes, et cetera). When this is the case, the data segment VC1_C will be padded and/or aligned via the reassembled buffer to be of the desired data segment size and aligned along word boundaries. Further note that each of the data segments may be referred to as data fragments. The segmenting of packets continues for the data produced via virtual channel 1 as shown. The transmit MAC module then maps the data segments from the plurality of control virtual channels and control information into a particular format for transmission via the physical link. As shown, the data segments for virtual channel 1 are mapped into the format of the physical link, which provides a multiplexing of data segments from the plurality of virtual channels along with control information.

At the receiver side of the interface 54 or 56 the transmitted data is received as a stream of data. As stated with respect to FIG. 6, the receiver section segments the stream of data and stores it via an elastic storage device. The decoder decodes the segments to determine control and data information. Based on the decoded information, the routing module coordinates the reassembly of the packets for each of the virtual channels. As shown, the resulting data stored in the receiver buffer includes the data segments corresponding to packet 1, the data segments corresponding to packet 2 and the data segments corresponding to packet 3 for virtual channel 1.

Figure 8:
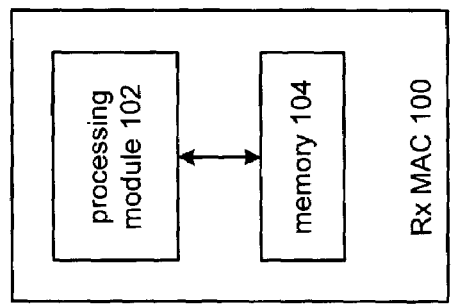
FIG. 8 is a schematic block diagram of an alternate embodiment of a receiver media access control module.

FIG. 8 is a schematic block diagram of a receiver MAC module 100 that includes a processing module 102 and memory 104. The processing module 102 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 104 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 102 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 104 stores, and the processing module 102 executes, operational instructions corresponding to at least some of the steps and/or functions illustrated in FIGS. 9 and 10.

Figure 9:
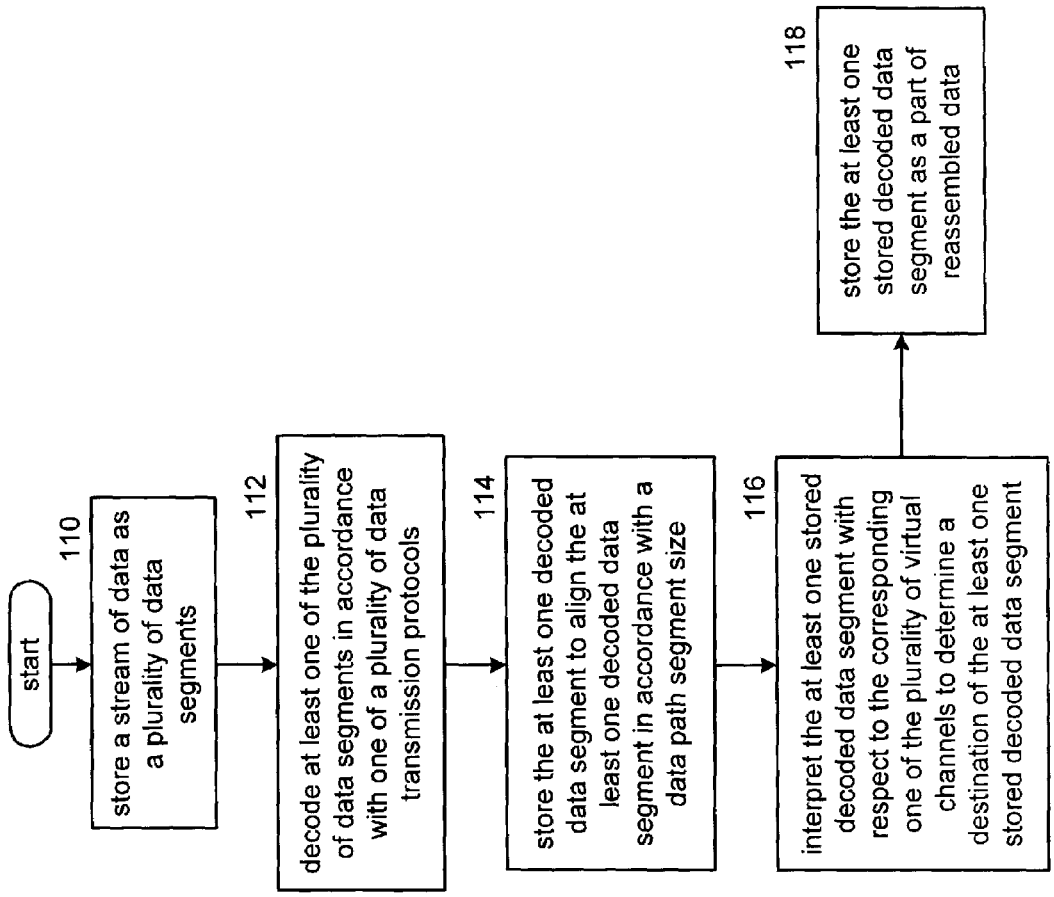
FIG. 9 is a logic diagram of a method for receiving data from a plurality of virtual channels in accordance with the present invention.

FIG. 9 is a logic diagram of a method that may be performed by the receiver MAC module 100 to receive data from a plurality of virtual channels via a physical link. The process begins at Step 110 where the receiver MAC module stores a stream of data as a plurality of data segments. The stream of data includes multiplexed data fragments from at least one of the plurality of virtual channels. A data segment of the plurality of data segments corresponds to one of the multiplexed data fragments. This was graphically illustrated in FIGS. 6 and 7.

The process then proceeds to Step 112 where the receiver MAC module decodes the at least one of the plurality of data segments in accordance with one of a plurality of data transmission protocols to produce a decoded data segment. The decoding may be done in accordance with a HyperTransport protocol, in accordance with a system packet interface protocol, in accordance with a type of packet switched protocol and/or in accordance with a type of circuit switched protocol. The process then proceeds to Step 114 where the receiver MAC module stores the decoded data segment to align and/or pad the decoded data segment in accordance with a data path segment size and/or desired data word boundaries. The decoded data segment may be stored in a $1^{st}$ portion of the reassembly buffer while another decoded data segment is stored in a $2^{nd}$ portion of the entry of the reassembly buffer. The receiver MAC module may interpret a header portion of the decoded data segment to determine whether the decoded data segment is part of a control word regarding associated data, a control word regarding unassociated data or is part of the data word. When the decoded data segment is part of a control word regarding associated data or is part of a data word (e.g., part of a packet transmitted by a virtual channel) the decoded data segment is stored as previously described with reference to FIG. 6. If, however, the decoded data segment is part of a control word regarding unassociated data, the data contained in the data portion is stored as being associated with another decoded data segment (i.e., is associated with a different virtual channel than that of the control word). In other words, if a control header is provided along with unassociated data, the transmitted data portion of the received segment still includes a control section and data section, but the data section includes data that is to be associated with a different data segment.

The process then proceeds to Step 116 where the receiver MAC module interprets a stored decoded data segment with respect to the corresponding one of the plurality of virtual channels to determine a destination of the at least one stored decoded data segment. The storage of the data segment is in accordance with the description provided with FIG. 6. In addition, the determination of the destination may be to a $1^{st}$ input queue of a packet manager as the destination, a $2^{nd}$ input queue of the packet manager or the transmit MAC module may be the destination of the reassembly packet. Such a determination of the destination is generally referred to as a mapping of the input virtual channel that provided the packet to an output virtual channel of the receiving multiple processor device.

The process then proceeds to Step 118 where the receiver MAC module stores the at least one decoded data segment as part of reassembled data packets. Once at least a portion of a data packet is stored in the receiver buffer, it may be forwarded via the switching module 51 to a data manager (e.g., the node controller or packet manager) in accordance with the particular protocol being utilized. For example, when the protocol is in accordance with the SPI protocol, the data packets will generally be transmitted to the packet manager. In contrast, when the protocol is in accordance with the HyperTransport protocol, the data packets will be generally provided to the node controller of the other switch.

Figure 10:
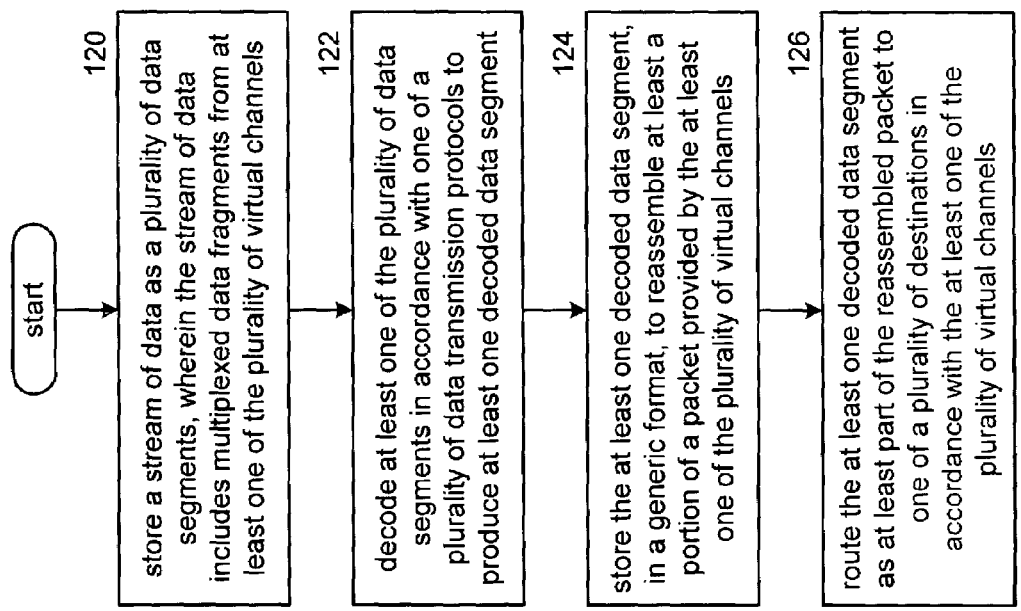
FIG. 10 is a logic diagram of an alternate method for receiving data from a plurality of virtual channels in accordance with the present invention.

FIG. 10 is a logic diagram of an alternate method for receiving data from a plurality of virtual channels by a multiple processor device. The process begins at Step 120 where a receiver MAC module of a multiple processor device stores a stream of data as a plurality of data segments. The stream of data includes multiplex data fragments from at least one of a plurality of virtual channels. A data segment of the plurality of data segments corresponds to one of the multiplex data fragments. This was illustrated in FIGS. 6 and 7.

The process then proceeds to Step 122 where the receiver MAC module decodes at least one of the plurality of data segments in accordance with one of the plurality of data transmission protocols (e.g., HT, SPI, et cetera) to produce at least one decoded data segment. The process then proceeds to Step 124 where the receiver MAC module stores the at least one decoded data segment, in a generic format, to reassemble at least a portion of a packet provided by the at least one of the plurality of virtual channels. The process then proceeds to Step 126 where the receiver MAC module routes the at least one decoded data segment as at least part of the reassembled packet to one of a plurality of destinations in accordance with the at least one of the plurality of virtual channels.

The preceding discussion has presented a method and apparatus for processing received data that corresponds to a plurality of virtual channels. By utilizing such a method and apparatus within a multiple processor device, the multiple processor device may utilize one or more communication protocols to interface with other multiple processor devices and one or more configurations while overcoming bandwidth limitations, latency limitations and other limitations associated with the use of high speed chains. As one of average skill in the art will appreciate, other embodiments may be derived from the teaching of the present invention, without deviating from the scope of the claims.

What is claimed is:

1. A method for receiving data from a plurality of virtual channels, the method comprises:
    storing a stream of data as a plurality of data segments, wherein the stream of data includes multiplexed data fragments from at least one of the plurality of virtual channels, and wherein a data segment of the plurality of data segments corresponds to one of the multiplexed data fragments;
    decoding at least one of the plurality of data segments in accordance with one of a plurality of data transmission protocols to produce at least one decoded data segment;
    storing the at least one decoded data segment to align the at least one decoded data segment in accordance with a data path segment size to produce at least one stored decoded data segment;
    interpreting the at least one stored decoded data segment with respect to a corresponding one of the plurality of virtual channels to determine a destination of the at least one stored decoded data segment; and storing the at least one stored decoded data segment as a part of reassembled data.

2. The method of claim 1, wherein the decoding the at least one of the plurality of data segments further comprises:

decoding the at least one of the plurality of data segments in accordance with a HyperTransport protocol when a protocol select signal is in a first state; and decoding the at least one of the plurality of data segments in accordance with a System Packet Interface protocol when the protocol select signal is in a second state.

3. The method of claim 1, wherein the storing the at least one decoded data segment further comprises:

storing the at least one decoded data segment in a first portion of an entry in a reassembly buffer;

storing another decoded data segment in a second portion of the entry, wherein the at least one decoded data segment and the another decoded data segment are stored in a generic format.

4. The method of claim 1, wherein the storing the at least one decoded data segment further comprises:

interpreting a header of the at least one decoded data segment to determine whether the at least one decoded data segment is at least part of a control word with data, a control word without data, or a data word;

when the at least one decoded data segment is at least part of the control word with data or the data word, storing the at least one decoded data segment; and when the at least one decoded data segment is at least part of the control word without data, storing data of the at least one decoded data segment as being associated with another decoded data segment.

5. The method of claim 1 further comprises:

forwarding, via a switch, at least a portion of the reassembled data to a first data manager when the decoding of the at least one of the plurality of data segments is in accordance with a first protocol of the plurality of data transmission protocols and in accordance with the destination; and forwarding, via switch, the reassembled data to a second data manager when the decoding of the at least one of the plurality of data segments is in accordance with a second protocol of the plurality of data transmission protocols and in accordance with the destination.

6. The method of claim 1, wherein the determining the destination further comprises at least one of:

determining a first input queue as the destination;

determining a second input queue as the destination; and determining a transmit module as the destination.

7. The method of claim 1, wherein the determining the destination further comprises:

mapping the corresponding one of the plurality of virtual channels to one of a plurality of output virtual channels.

8. A media access control (MAC) module comprises:

an elastic storage device operably coupled to store, at a first rate, a stream of data as a plurality of data segments, wherein the stream of data includes multiplexed data fragments from at least one of a plurality of virtual channels, and wherein a data segment of the plurality of data segments corresponds to one of the multiplexed data fragments;

decoder module operably coupled to retrieve, at a second rate, at least one of the plurality of data segments from the elastic storage device, wherein the decoder module decodes the at least one of the plurality of data segments in accordance with one of a plurality of data transmission protocols to produce at least one decoded data segment;

reassembly buffer operably coupled to store the at least one decoded data segment such that the at least one decoded data segment is aligned with a corresponding one of the plurality of virtual channels to produce at least one stored decoded data segment;

routing module operably coupled to interpret, with respect to the corresponding one of the plurality of virtual channels, the at least one stored decoded data segment to determine a destination of reassembled data that includes the at least one stored decoded data segment; and receiver buffer operably coupled to store at least a portion of the reassembled data.

9. The MAC module of claim 8, wherein the decoder module further comprises:

a HyperTransport decoder operable to decode the at least one of the plurality of data segments when a protocol select signal is in a first state; and a System Packet Interface decoder operable to decode the at least one of the plurality of data segments when the protocol select signal is in a second state.

10. The MAC module of claim 8, wherein the reassembly buffer further comprises:

a first portion for storing the at least one decoded data segment during a receiving interval;

a second portion for storing another decoded data segment during the receiving interval, wherein the at least one decoded data segment and the another decoded data segment are stored in a generic format.

11. The MAC module of claim 8, wherein the destination further comprises at least one of:

a first input queue;

a second input queue; and a transmit module.

12. The MAC module of claim 8, wherein the routing module further comprises:

mapping information that maps the corresponding one of the plurality of virtual channels to one of a plurality of output virtual channels.

13. An apparatus for receiving data from a plurality of virtual channels, the apparatus comprises:

processing module; and memory operably coupled to the processing module wherein the memory includes operational instructions that cause the processing module to:

store a stream of data as a plurality of data segments, wherein the stream of data includes multiplexed data fragments from at least one of the plurality of virtual channels, and wherein a data segment of the plurality of data segments corresponds to one of the multiplexed data fragments;

decode at least one of the plurality of data segments in accordance with one of a plurality of data transmission protocols to produce at least one decoded data segment;

store the at least one decoded data segment to align the at least one decoded data segment in accordance with a data path segment size to produce at least one stored decoded data segment;

interpret the at least one stored decoded data segment with respect to a corresponding one of the plurality of virtual channels to determine a destination of the at least one stored decoded data segment; and store the at least one stored decoded data segment as a part of reassembled data.

14. The apparatus of claim 13, wherein the memory further comprises operational instructions that cause the processing module to decode the at least one of the plurality of data segments by:
   decoding the at least one of the plurality of data segments in accordance with a HyperTransport protocol when a protocol select signal is in a first state; and
   decoding the at least one of the plurality of data segments in accordance with a System Packet Interface protocol when the protocol select signal is in a second state.

15. The apparatus of claim 13, wherein the memory further comprises operational instructions that cause the processing module to store the at least one decoded data segment by:
   storing the at least one decoded data segment in a first portion of an entry in a reassembly buffer;
   storing another decoded data segment in a second portion of the entry, wherein the at least one decoded data segment and the another decoded data segment are stored in a generic format.

16. The apparatus of claim 13, wherein the memory further comprises operational instructions that cause the processing module to store the at least one decoded data segment by:
   interpreting a header of the at least one decoded data segment to determine whether the at least one decoded data segment is at least part of a control word with data, a control word without data, or a data word;
   when the at least one decoded data segment is at least part of the control word with data or the data word, storing the at least one decoded data segment; and
   when the at least one decoded data segment is at least part of a control word without data, storing data of the at least one decoded data segment as being associated with another decoded data segment.

17. The apparatus of claim 13, wherein the memory further comprises operational instructions that cause the processing module to:
   forward, via a switch, at least a portion the reassembled data to a first data manager when the decoding of the at least one of the plurality of data segments is in accordance with a first protocol of the plurality of data transmission protocols and in accordance with the destination; and
   forward, via the switch, the reassembled data to a second data manager when the decoding of the at least one of the plurality of data segments is in accordance with a second protocol of the plurality of data transmission protocols and in accordance with the destination.

18. The apparatus of claim 13, wherein the memory further comprises operational instructions that cause the processing module to determine the destination by at least one of:
   determining a first input queue as the destination;
   determining a second input queue as the destination; and
   determining a transmit module as the destination.

19. The apparatus of claim 13, wherein the memory further comprises operational instructions that cause the processing module to determine the destination by:
   mapping the corresponding one of the plurality of virtual channels to one of a plurality of output virtual channels.

20. A multiple processor integrated circuit comprises:
   a plurality of processing units;
   cache memory;
   memory controller operably coupled to system memory;
   internal bus operably coupled to the plurality of processing units, the cache memory and the memory controller;
   packet manager operably coupled to the internal bus;
   node controller operably coupled to the internal bus;
   first configurable packet-based interface;
   second configurable packet-based interface; and
   switching module operably coupled to the packet manager, the node controller, the first configurable packet-based interface, and the second configurable packet-based interface, wherein each of the first and second configurable packet-based interfaces include a input/output module and a media access control (MAC) layer module, wherein the MAC layer module includes:
   an elastic storage device operably coupled to store, at a first rate, a stream of data as a plurality of data segments, wherein the stream of data includes multiplexed data fragments from at least one of a plurality of virtual channels, and wherein a data segment of the plurality of data segments corresponds to one of the multiplexed data fragments;
   decoder module operably coupled to retrieve, at a second rate, at least one of the plurality of data segments from the elastic storage device, wherein the decoder module decodes the at least one of the plurality of data segments in accordance with one of a plurality of data transmission protocols to produce at least one decoded data segment;
   reassembly buffer operably coupled to store the at least one decoded data segment such that the at least one decoded data segment is aligned with a corresponding one of the plurality of virtual channels to produce at least one stored decoded data segment;
   routing module operably coupled to interpret, with respect to the corresponding one of the plurality of virtual channels, the at least one stored decoded data segment to determine a destination of reassembled data that includes the at least one stored decoded data segment; and
   receiver buffer operably coupled to store at least a portion of the reassembled data.

21. The multiple processor integrated circuit of claim 20, wherein the decoder module further comprises:
   a HyperTransport decoder operable to decode the at least one of the plurality of data segments when a protocol select signal is in a first state; and
   a System Packet Interface decoder operable to decode the at least one of the plurality of data segments when the protocol select signal is in a second state.

22. The multiple processor integrated circuit of claim 20, wherein the reassembly buffer further comprises:
   a first portion for storing the at least one decoded data segment during a receiving interval;
   a second portion for storing another decoded data segment during the receiving interval, wherein the at least one decoded data segment and the another decoded data segment are stored in a generic format.

23. The multiple processor integrated circuit of claim 20, wherein the destination further comprises at least one of:
   a first input queue;
   a second input queue; and
   a transmit module.

24. The multiple processor integrated circuit of claim 20, wherein the routing module further comprises:
   mapping information that maps the corresponding one of the plurality of virtual channels to one of a plurality of output virtual channels.

25. A multiple processor integrated circuit comprises:
a plurality of processing units;
cache memory;
memory controller operably coupled to system memory;
internal bus operably coupled to the plurality of processing units, the cache memory and the memory controller;
packet manager operably coupled to the internal bus;
node controller operably coupled to the internal bus;
first configurable packet-based interface;
second configurable packet-based interface; and
switching module operably coupled to the packet manager, the node controller, the first configurable packet-based interface, and the second configurable packet-based interface, wherein each of the first and second configurable packet-based interfaces include a input/output module and a media access control (MAC) layer module, wherein the MAC layer module includes:
processing module; and
memory operably coupled to the processing module wherein the memory includes operational instructions that cause the processing module to:
store a stream of data as a plurality of data segments, wherein the stream of data includes multiplexed data fragments from at least one of a plurality of virtual channels, and wherein a data segment of the plurality of data segments corresponds to one of the multiplexed data fragments;
decode at least one of the plurality of data segments in accordance with one of a plurality of data transmission protocols to produce at least one decoded data segment;
store the at least one decoded data segment to align the at least one decoded data segment in accordance with a data path segment size to produce at least one stored decoded data segment;
interpret the at least one stored decoded data segment with respect to a corresponding one of the plurality of virtual channels to determine a destination of the at least one stored decoded data segment; and
store the at least one stored decoded data segment as a part of reassembled data.

26. The multiple processor integrated circuit of claim 25, wherein the memory further comprises operational instructions that cause the processing module to decode the at least one of the plurality of data segments by:
decoding the at least one of the plurality of data segments in accordance with a HyperTransport protocol when a protocol select signal is in a first state; and
decoding the at least one of the plurality of data segments in accordance with a System Packet Interface protocol when the protocol select signal is in a second state.

27. The multiple processor integrated circuit of claim 25, wherein the memory further comprises operational instructions that cause the processing module to store the at least one decoded data segment by:
storing the at least one decoded data segment in a first portion of an entry in a reassembly buffer;
storing another decoded data segment in a second portion of the entry, wherein the at least one decoded data segment and the another decoded data segment are stored in a generic format.

28. The multiple processor integrated circuit of claim 25, wherein the memory further comprises operational instructions that cause the processing module to store the at least one decoded data segment by:
interpreting a header of the at least one decoded data segment to determine whether the at least one decoded data segment is at least part of a control word with data, a control word without data, or a data word;
when the at least one decoded data segment is at least part of the control word with data or the data word, storing the at least one decoded data segment; and
when the at least one decoded data segment is at least part of a control word without data, storing data of the at least one decoded data segment as being associated with another decoded data segment.

29. The multiple processor integrated circuit of claim 25, wherein the memory further comprises operational instructions that cause the processing module to:
forward, via a switch, at least a portion the reassembled data to a first data manager when the decoding of the at least one of the plurality of data segments is in accordance with a first protocol of the plurality of data transmission protocols and in accordance with the destination; and
forward, via switch, the reassembled data to a second data manager when the decoding of the at least one of the plurality of data segments is in accordance with a second protocol of the plurality of data transmission protocols and in accordance with the destination.

30. The multiple processor integrated circuit of claim 25, wherein the memory further comprises operational instructions that cause the processing module to determine the destination by at least one of:
determining a first input queue as the destination;
determining a second input queue as the destination; and
determining a transmit module as the destination.

31. The multiple processor integrated circuit of claim 25, wherein the memory further comprises operational instructions that cause the processing module to determine the destination by:
mapping the corresponding one of the plurality of virtual channels to one of a plurality of output virtual channels.

* * * * *